United States Patent Office 3,357,724
Patented Dec. 12, 1967

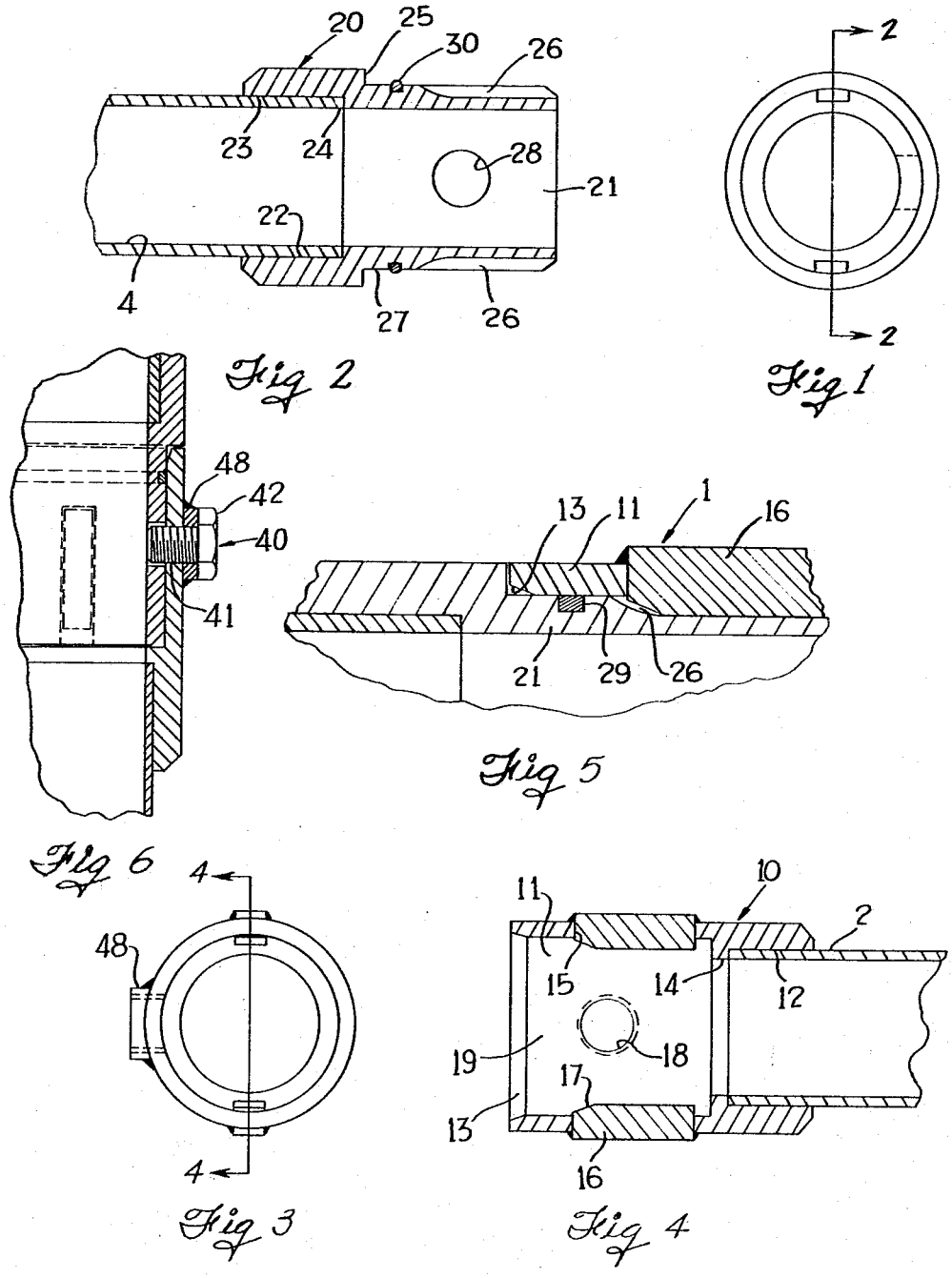

3,357,724
SEALED DRILL-STRING JOINT
Charles L. Rassieur, University City, Mo., assignor to Central Mine Equipment Company, St. Louis, Mo., a corporation of Missouri
Filed July 6, 1965, Ser. No. 469,466
6 Claims. (Cl. 285—330)

ABSTRACT OF THE DISCLOSURE

A hollow drill-string joint with a female part with a cylindrical socket section at one end and a cylindrical drill string bore at the other, forming a continuous through passage, the socket section having a feather key slot extending entirely through its wall but at a distance, axially from the outer end of the socket section so as to leave an uninterrupted, smooth inner surface between the outer end and the slot; a feather key mounted in the slot, projecting radially inwardly into the socket section and secured on the outside of the socket section to the wall thereof. The socket section has an aperture through its wall spaced circumferentially from the key. A hollow, male part has a cylindrical coupling section at one end complementary to the socket section of the female part, and a cylindrical drill string bore at the other end to define a continuous through passage in the male part. The male part has a keyway extending axially from its outer edge but terminating short of the inner end of the coupling section, leaving an area in which an annular seating channel is provided. The male part has a radial aperture positioned complementarily to the aperture in the female part. An O-ring is seated in the annular seating channel and is arranged to engage the smooth surface of the inner wall of the female part radially, when the joint is assembled. A bolt, extending through the apertures in the female and male parts respectively, prevents axial movement, and permits easy assembly and disassembly.

Background of the invention

This invention relates to drill-string joints, used to join sections of rotary earth boring drill-strings.

Drill string joints, sometimes called tool joints or couplings are now commonly threaded. Threaded joints have several disadvantages. If the rotation of the drill string has to be reversed, as sometimes happens if a flighted string becomes stuck, for example, the joints are liable to unscrew, leaving sections of drill string in the hole. On the other hand it is often difficult to unscrew joints when it is desired to disassemble the string, and if, as is frequently the case, the drill mechanism is used to unscrew the coupling, the excessive effort required leads to wear and damage of the drill mechanism.

One of the objects of this invention is to provide a simple, easily coupled and uncoupled drill-string joint which is substantially watertight.

Another object is to provide a drill string joint which will withstand a rotary torsional load equally in both clockwise and counterclockwise directions.

Still another object is to provide such a joint which can be assembled with only relative axial movement of the parts of the joint.

Still another object of this invention is to provide such a joint at little or no increase in cost as compared with joints now in use.

Other objects will become apparent to those skilled in the art in the light of the following description and accompanying drawing.

Summary of the invention

In accordance with this invention, generally stated, a hollow drill-string joint is provided which includes a hollow, female, outer part with a cylindrical socket section at one end and a cylindrical drill-string bore section at the other end, the socket and bore sections forming a continuous coupling section at one end complementary to the socket section of the female part for slidable mounting therein and a cylindrical drill stem bore section at the other end, the hollow coupling and bore sections defining a continuous through passage; a sealing element around the inner coupling section, engaging the inner surface of the wall of the socket section, and retaining means for retaining the two parts against axial displacement with respect to one another.

The socket section of the outer part is provided with an axially elongated feather key slot extending entirely through its wall. A feather key is secured in the slot. The feather key projects radially inwardly into the socket section, and radially outwardly through the feather key slot, preferably beyond the level of the outside surface of the socket section, and is secured, as by welding, brazing or the like, at the outside surface of the wall of the socket section.

The inner coupling section is provided on its radially outer surface with a keyway extending axially from an end of the coupling, compelmentarily in shape and position to the inwardly projecting part of the feather key, slidably to receive the key when the joint is assembled.

The feather key is spaced axially from the open end of the socket section, leaving an uninterrupted inner surface in the socket between the key and the end. The keyway is spaced axially from the axially inner end of the outer wall of the coupling section, leaving an axially uninterrupted area on the outer surface of the coupling section. An annular channel extends around the coupling section in the axially uninterrupted area of the coupling section outer wall. The annular channel is so positioned relative to the socket section when the joint is assembled as to fall within the compass of the uninterrupted inner surface of the socket section of the outer part. The sealing element, preferably in the form of an O-ring, is seated in the annular channel and protrudes into compressive engagement with the inner surface of the coupling section when the joint is assembled.

In the preferred embodiment, the outer part has a threaded aperture in it extending radially through the socket section wall at a circumferential position 90° from the feather key, and within the axial reach of the feather key, and the coupling section of the inner part has an aperture complementary in size and position to the aperture in the socket section.

In the preferred embodiment, the retaining means takes the form of a bolt, threaded into the apertures. Also in the preferred embodiment, two feather keys and keyways, diametrically opposed, rather than one, are provided.

Brief description of the drawing

In the drawings,
FIGURE 1 is a top plan view of one of the parts of an illustrative embodiment of joint of this invention;
FIGURE 2 is a sectional view taken along the line 2—2 of FIGURE 1;
FIGURE 3 is a top plan view of the other of the two parts of the joint;
FIGURE 4 is a sectional view taken along the line 4—4 of FIGURE 3;
FIGURE 5 is a fragmentary sectional view showing the two parts in coupled relation; and
FIGURE 6 is a fragmentary sectional view taken at right angles to the section of FIGURE 5.

Description of the preferred embodiment

Referring now to the drawing for one illustrative embodiment of this invention, reference numeral 1 indicates a completed hollow drill-string joint. The joint 1 is made up of a hollow female outer part 10, a hollow male inner part 20, a sealing means in the form of an O-ring 30, and retaining means, in the form of a threaded bolt 40.

The outer part 10 includes a cylindrical socket section 11 at one end, and a cylindrical drill-string bore at the other. The socket section and drill-string bore form a continuous through passage in the outer part 10. The axially outer end of the socket section 11 is provided with a radially outwardly diverging bevel 13 on its radially inner surface. A radially inwardly projecting annular rib 14 defines the axially inner end of the inner wall of the socket section, and axially inner end of the inner wall of the bore 12. The wall of the outer part 10 defining the drill-string bore 12 is thicker than the wall defining the socket section, but the rib 14 extends radially inwardly sufficiently far from the inner surface of the bore-defining wall to provide a shoulder to receive the axially outer end of a drill-string 2 and to provide a substantially smooth continuation of the bore of the hollow drill-string. The drill string 2 is secured in position by any suitable means, as by welding.

The wall defining the socket section is provided with two, diametrically oppositely positioned, axially elongated, substantially rectangular feather key slots 15, in which feather keys 16 are mounted to fit closely, and are secured, by welding in this embodiment, at the outside surface of the wall defining the socket section 11. The feather keys 16 project radially inwardly into the socket section 16 and outwardly beyond the level of the outer surface of the wall defining the socket section 11. The axially outer, radially inner corner of each feather key is chamfered to form a sloping leading edge 17.

A threaded aperture 18 extends through the wall defining the socket section 11, midway, circumferentially, between the feather keys 16.

It will be observed that the feather key slots 15, hence the feather keys 16, and the aperture 18 all lie at a distance axially from the outer end of the socket section 11, so that between them and the beveled section 13 there is a smooth, uninterrupted sealing area 19 of the inner surface of the wall defining the socket section 11.

In this embodiment, a threaded reinforcing nut 48 is welded to the outside of the socket section 11, with its threaded aperture in alignment with the aperture 18, to provide a boss for additional thread area for engagement with external threads 41 of a shank of the bolt 40. The bolt 40 also has a head 42.

The inner part 20 of the joint has a cylindrical coupling section 21 at one axial end, and a drill-string bore 22 at its axially other end. The hollow coupling section and the drill-string bore 22 define together a through passage.

A part of the inner wall of the drill-string bore 22, from its axially outer end, is offset radially outwardly, to define a smooth drill-string receiving section 23 and an internal shoulder 24. The shoulder 24 is of a depth with the thickness of the wall of a drill-string 4, an end of which is seated within the section 23 and against the shoulder 24, and secured in this position in any desired way, as by welding.

The wall of the drill-string section is thicker than the wall of the coupling section 21, so that the sections define between them an external shoulder 25. Extending from its axially outer end, the coupling section 21 has in its outer surface a pair of keyways 26, complementary in position and radial depth to the part of the feather keys of the female section 10 extending within the socket section 19 slidably to receive the keys. The keyways 26 terminate at a distance, axially, from the shoulder 25, leaving an axially uninterrupted section 27 in the outer surface of the coupling section. Near, but axially spaced away from the axially inner ends of the keyways 26 is an annular seating channel 29, in which the O-ring 30 is seated. The O-ring 30 protrudes radially beyond the level of the surface of the coupling section 21, as shown in FIGURE 2. An aperture 28 extends through the wall of the coupling section 21, in a position complementary to that of the aperture 18 of the socket section of the outer part 10 so that when the joint is assembled the shank of the bolt 40 can project into the aperture 28. The axially outer end of the coupling section 21 is chamfered to facilitate its insertion into the socket section of the outer part.

The radial height of the rib 14 in the socket section 11 is the same as the radial thickness of the wall of the coupling section 21. The outer diameter of the coupling section 21 is only slightly less than the inner diameter of the socket section 11, to provide a close but slidable fit between the two. The protrusion of the O-ring 30 is such as to permit the sections to be coupled in the presence of a lubricant when the O-ring is compressed between the walls defining the channel 29 and the uninterrupted inner surface 19 of the socket section 11, as shown particularly in FIGURE 5.

I assembling the joint of this invention, it is only necessary to line up the keyways 26 with the feather keys 16, which can readily be done by observation since the keyways 26 are readily visible and the feather keys 16 are also immediately observable from the outside of the socket section. The socket section and coupling section are telescoped until the axially outer ends of the two sections abut the shoulders on the others, and the apertures 18 and 28 are axially aligned. The bolt 40 is then screwed into the aperture 18, until its shank extends into the aperture 28, and the head engages the boss 48 tightly. The bolt 40 serves only to prevent axial displacement of the two parts of the joint with respect to one another. All of the forces generated by the rotation of the drill-string in use, are transmitted and borne by the keys 16 and the side walls of the keyway.

The provision of the straight, axially extending keys 16, projecting radially outwardly through and from the wall of the outer section 10 has several advantages. Not only does it enable axial alignment of the two parts during assembly, and permit the use of special alloys in the fabrication of the keys, but it also permits easy and highly effective securement of the keys within the slots, because the welding, brazing, or other securing process is performed exteriorly of the socket, where it can be done easily and tested adequately. The use of such keys and keyways, also makes the use of the O-ring simple and effective since only an axial movement of the coupling members is exerted on the O-ring. The bevel 13 aids in the compression of the O-ring, and makes assembly easy.

Numerous variations in the construction of the joint, within the scope of the appended claims, will occur to those skilled in the art in the light of the foregoing disclosure.

Having thus described the invention what is claimed and desired to be secured by Letters Patent is:

1. A hollow drill-string joint comprising a hollow, female, outer part with a cylindrical socket section at one end thereof, and a cylindrical drill-string section having a bore at the other end thereof, said socket and bore sections forming a continuous through passage in said female part, said socket section having an axially extending feather key slot extending radially through the wall thereof at a distance axially from the outer end of said socket section to provide an uninterrupted smooth inner surface between said end and said slot, a feather key removably mounted in said slot, projecting radially inwardly into said socket section and secured on the outside of said socket section to the outside wall thereof, said socket section having an aperture through the wall thereof spaced circumferentially from said key; a hollow, male, inner part with a cylindrical coupling section at one end complementary to said socket section of said female part for close sliding fit therein and a cylindrical drill-string section having a bore at the other end, said coupling section and bore defining a continuous through passage in said male part, said coupling section having in the radially outer surface of its cylindrical wall a keyway extending axially thereof from and opening into its axially outer end and terminating short of the other end of said coupling section, leaving an axially uninterrupted area in the outer surface of the coupling section, an annular seating channel in and extending around the radially outer surface of said coupling section within the axially uninterrupted area of said coupling section, said feather key being formed of a material different from the material forming either the said male or female part, said coupling section having an aperture positioned complementarily to said female part aperture within the axially interrupted area of said coupling section and spaced circumferentially from said keyway; a sealing element sealingly seated in said annular channel and protruding radially outwardly therefrom into snug sealing engagement with the inner uninterrupted surface of said female socket section when the joint is assembled, and retaining means extending through the aperture in said female socket section and into the aperture in said male coupling section to prevent axial displacement of said sections with respect to one another when the joint is assembled.

2. The drill-string joint of claim 1 wherein a plurality of feather keys and feather keyways is provided in the female and male parts respectively.

3. The drill-string joint of claim 1 wherein the socket section of the female part is provided at its axially outer radially inner edge with a beveled section.

4. The drill-string joint of claim 1 wherein a radially inwardly extending rib in the female part defines the axially inner end of the socket section and bore section respectively.

5. The drill-string joint of claim 1 wherein the sealing element is an O-ring.

6. The drill-string joint of claim 1 wherein the retaining means is a threaded bolt, and the aperture in the socket section of the female part is internally threaded to receive the bolt.

References Cited

UNITED STATES PATENTS

| | | | |
|---|---|---|---|
| 2,075,483 | 3/1937 | Trotter | 285—374 X |
| 2,226,547 | 12/1940 | Boynton | 285—330 |
| 2,246,436 | 6/1941 | Downey | 285—347 |
| 2,693,974 | 11/1954 | Taylor et al. | 287—103 |
| 2,899,218 | 8/1959 | Creighton | 285—330 X |
| 3,145,018 | 8/1964 | Goodwiller | 287—52.08 X |

CARL W. TOMLIN, *Primary Examiner.*

D. W. AROLA, *Assistant Examiner.*